United States Patent [19]

Shinjo et al.

[11] Patent Number: 5,360,137
[45] Date of Patent: Nov. 1, 1994

[54] ROW FEEDER FOR DISTRIBUTING NUTS

[75] Inventors: Hiroshi Shinjo, Osaka; Arata Takeda, Aichi, both of Japan

[73] Assignee: Yugenkaisha Shinjo Seisakusho, Osaka, Japan

[21] Appl. No.: 92,493

[22] Filed: Jul. 16, 1993

[30] Foreign Application Priority Data

Jul. 17, 1992 [JP] Japan ................... 4-213498

[51] Int. Cl.⁵ .............................. B65H 5/00
[52] U.S. Cl. ...................... 221/238; 221/268; 414/224
[58] Field of Search ............ 221/134, 224, 225, 93, 221/68, 124, 123, 233, 234, 268, 271-276, 298, 299, 296, 294, 236, 238, 10, 11; 227/119, 109, 137, 135; 470/167; 414/224; 29/809, 810, 798

[56] References Cited

U.S. PATENT DOCUMENTS

| | | | |
|---|---|---|---|
| 2,379,501 | 7/1945 | Steiner et al. | 221/11 |
| 2,544,165 | 3/1951 | Krasnow | 221/299 |
| 3,114,477 | 12/1963 | Dixon | 221/238 |
| 3,297,199 | 1/1967 | Law | 221/268 |
| 4,815,206 | 3/1989 | Jangaard | 29/809 |

FOREIGN PATENT DOCUMENTS 88703 4/1987 Japan ................... 414/224

Primary Examiner—Kenneth W. Noland
Attorney, Agent, or Firm—Antonelli, Terry, Stout & Kraus

[57] ABSTRACT

A row feeder for distribution of nuts has: a guide passage (14) formed on a main unit (11) so as to receive a number of successively delivered nuts "N" in a series; a plurality of distribution passages (15) formed on the main unit and each extending from and perpendicular to the guide passage; stroking pushers (16) reciprocatable across the guide passage (14) so as to transfer the nuts "N" lying on it to the respective distribution passages (15); drivers (e.g., pneumatic cylinders) (17) causing the respective stroking pushers (16) to reciprocate; and individual feed chutes (13) respectively connected to the distribution passages (15). The row feeder further comprises a joint member (12) as a separate member in addition to the main unit (11), and the feed chutes (13) are secured to the joint member at given intervals between them. The row feeder simple in structure can efficiently operate not only for feeding the self-piercing nuts "N" to the nut assembling apparatuses but also for distributing ordinary nuts to a plurality of nut welders.

5 Claims, 5 Drawing Sheets

ROW FEEDER FOR DISTRIBUTING NUTS

BACKGROUND OF THE INVENTION

The present invention relates to a row feeder for successively distributing nuts, as mechanical parts, from a delivery source to a plurality of nut attaching apparatuses such as nut welders or self-piercing nut assembling apparatuses.

There are widely used a number of weldable nuts or the so-called self-piercing nuts, and they are usually affixed to metal plates such as those which are typically incorporated motor vehicles. The self-piecing nut has an end face serving as a punch against the metal plate, thereby causing the nut to punch an installation aperture in the metal plate and to simultaneously fix the nut in place on the plate. In order to automate the nut attaching operation, the nut supplying apparatuses widely employ the so-called vibrating feeder.

When one automatic nut feeder successively supplies the nuts to one nut welder, a high capacity of the nut feeder is not fully utilized because the operation speed of the nut feeder is several times or several tens times as high as that of the nut welder.

The popular self-piercing nuts (hereinafter 'nut') are applied to various metal plates, typically to those which construct a motor vehicle body. It is a usual practice to attach in a one shot operation many such nuts to one metal plate as a workpiece, which in many cases is subjected at the same time to the punching, blanking, trimming and/or partial drawing processes. Generally, several sets of the nut assembling apparatuses are built in one press together with its main molds or parts. Any passage through which the nuts are fed to such self-piecing nut assembling apparatuses must not interfere with any punching dies or the like in the press. Thus, nut feeders are equipped in the vicinity of the press so as to deliver the nuts through flexible chute hoses to the respective nut assembling apparatuses. Due to a number of such apparatuses in one press, many chute hoses have to extend into the press and each of many nut feeders disposed near it must comprise a transfer device for causing the nuts to be supplied into the flexible chute hose. As a result, not only usual inspection and maintenance for changing or checking a press mold and/or maintenance work thereof but also operations for loading and unloading the press with a workpiece are rendered intricate. Further, the connecting and disconnecting of the chute hoses from the press are likewise made complicated, while other operations and the operator's movement around the press is difficult. In addition, since an automatic mold exchanger, in recently proposed large-scaled presses usually takes too much space, very little space is left for the nut feeders. It is very difficult and has been regarded as almost impossible to automate the connection and disconnection of a number of the chute hoses to and from the press mold.

OBJECTS AND SUMMARY OF THE INVENTION

An object of the present invention is therefore to provide a row feeder for distributing nuts to the self-piercing nut assembling apparatuses, wherein the row feeder is constructed such that all the problems inherent in the nut feeders for Prior Art apparatuses are resolved and that it also can efficiently operate for the nut welders.

In order to achieve this object, the row feeder provided herein for distribution of nuts comprises a main unit, a guide passage formed on the main unit so as to receive a series of successively delivered nuts, a plurality of distribution passages similarly formed on the main unit, with each distribution passage extending from and being disposed perpendicular to the guide passage, stroking pushers reciprocatable across the guide passage so as to transfer the nuts thereon to the respective distribution passages, drivers causing the respective stroking pushers to reciprocate, and individual feed chutes respectively connected to the distribution passages.

The stroking pushers are controlled so as to operate in response to the nut attaching apparatuses such as self-piercing nut assembling apparatuses or nut welders which are supplied with the nuts.

Each stroking pusher may, preferably, have a lower face formed with a cutout, such that the successively delivered nuts are not prevented from advancing forward along the guide passage while any stroking pusher is disposed across it to enter the distribution passage.

It may be advantageous for an easier control of the overall system that the stroking pushers operate individually and some of the pusher can be rendered inoperative if necessary.

In the row feeder constructed as above, the nuts which are successively delivered in series to the guide passage will be individually transferred by the stroking pushers the distribution passages connected to the feed chutes leading to nut assembling apparatuses or the like.

THE PREFERRED EMBODIMENTS OF THE INVENTION

An embodiment of the invention will now be described referring to the accompanying drawings.

Figure 1:
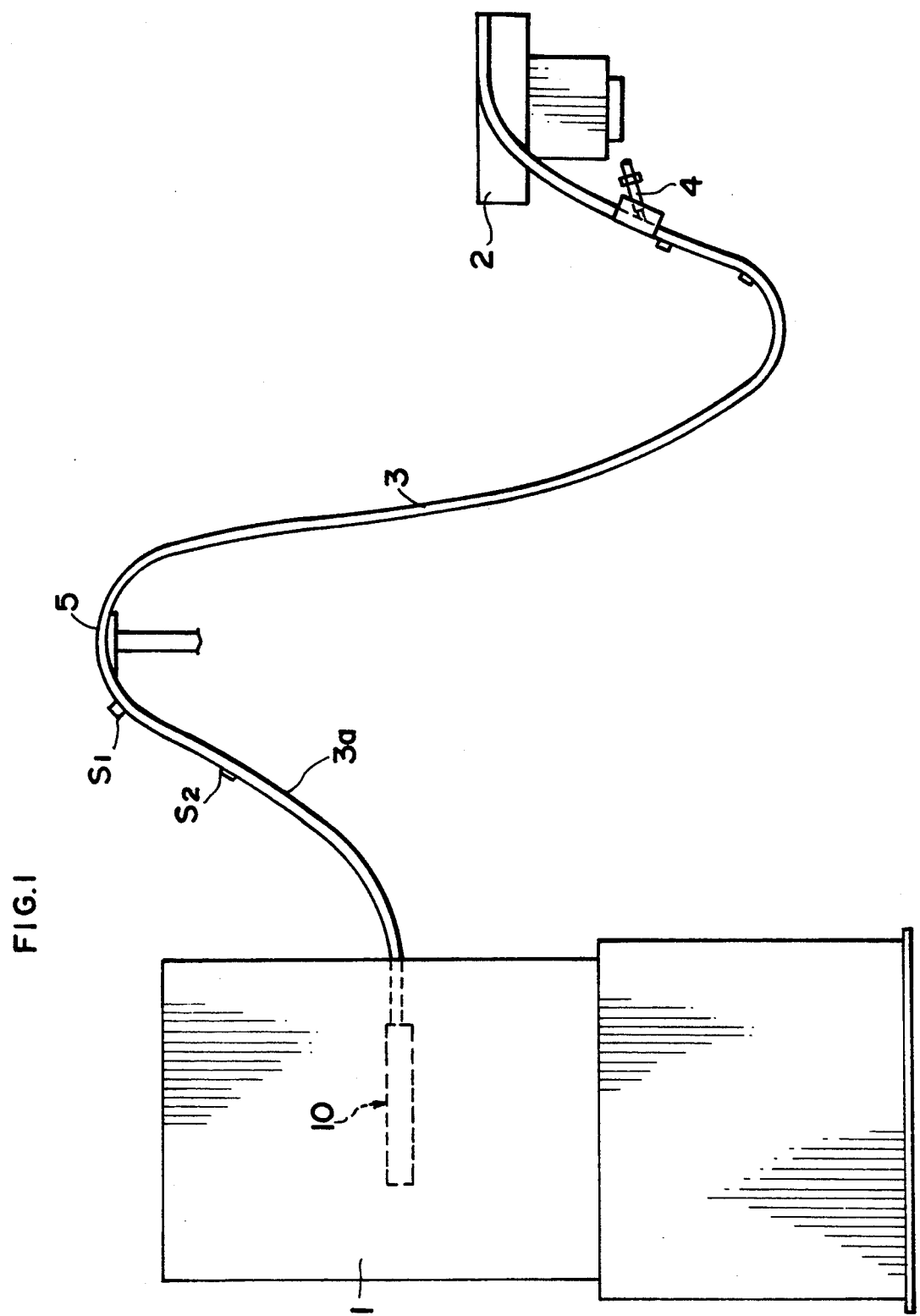
FIG. 1 is a schematic elevational side view of a system employing a row feeder constructed in accordance with the present invention.

FIG. 1 illustrates a system which includes a row feeder provided herein for distributing nuts, for example self-piecing nuts. This row feeder 10 is equipped in association with a press 1, wherein some sets of nut attaching apparatuses 7 as detailed below are incorporated in the press. A nut supplier 2, disposed in the vicinity of the press 1, arranged the self-piecing nuts to take their regulated position, before they are delivered in a successive manner to the row feeder 10 through a flexible chute hose 3. A pneumatically driven lift 4 is associated with the chute hose 3 at an appropriate region thereof. The self-piecing nuts will be elevated to a peak 5 of the hose higher than the row feeder 10 and then descend thereto due to gravitational force. Sensors S₁ and S₂, for detecting the nuts, are disposed along such a descent 3a of the chute hose 3, so that this descent is always filled with a predetermined number of the nuts. The weight of all the nuts within the descent 3a will act on the leading nut, so that they are delivered to the row feeder 10 in a continuous manner.

Each of the self-piercing nut assembling apparatuses 7 is secured to and disposed between a lower mold 8 and an upper mold 9, together with some dies and usual punches (not shown), wherein the lower mold is carried by a bolster 1a and the upper mold is detachably attached to a ram 1b of the press 1. Usually, several or more than ten such apparatuses 7 are mounted on one press 1, though only one of the apparatuses is illustrated in the drawings. The self-piercing nut assembling apparatuses 7 do not directly relate to the present invention. Thus, any details on its structure will not be given here, but only noting that an end face of each nut which will be fed through a feed chute 13 (described below) does act as a certain kind of punch. The nut thus punches a hole through a metal plate held on a swaging die and simultaneously becomes integral with the plate.

The row feeder 10 for distributing the nuts in this embodiment is carried partly by the ram 1b and also partly by the upper mold 9 of the press 1, as shown in FIGS. 4 to 7 and described below in detail referring thereto.

The row feeder 10 is composed of a main unit 11 and a joint member 12, and the main unit 11 is connected to a chute hose 3 through which a plurality of self-piercing nuts N are successively delivered to main unit. The joint member 12 is constructed to hold in place a plurality of feed chutes 13 arranged side by side and at given intervals therebetween, with the feed chutes being connected to the main unit 11. The main unit 11 may be integral with the joint member 12, but they preferably are separable from one another for an easier removal and change of the upper mold 9 from the ram 1b in the press 1, as in the illustrated embodiment. The main unit 11 comprises a guide passage 14 formed thereon to receive a number of successively supplied nuts N in series, a plurality of distribution passages 15 similarly formed on the main unit 11 and each extending from and perpendicular to the guide passage 14, and feed chutes 13 each secured to the corresponding distribution passage 15 in communication therewith. A plurality of stroking pushers 16, for pushing the nuts towards the respective distribution passages 15, are provided on the main body. Each of the stroking pushers 16 is operatively connected by a pin 19 to a piston rod 18 of a pneumatic cylinder 17 which is fixed on the main unit 11. A coiled spring 20 wound around the pin 19 always urges the stroking pusher 16 in a direction such that its forward free end 16a tends to take a lower position. The stroking pushers 16 are thus allowed to advance forwards across the guide passage 14 and into the respective distribution passages 15, and then to return to their home positions behind the guide passage 14 (see FIGS. 5 and 6). It will be understood that those pushers 16 are driven in response to the self-piercing nut assembling apparatuses 7. It is an important feature that the pushers 16 have their lower faces each formed with a cutout 21 which enables the free and unhindered feeding of nuts N along the guide passage 14 even while any stroking pushers 16 are operating across this passage and into the distribution passages 15.

Figure 2:
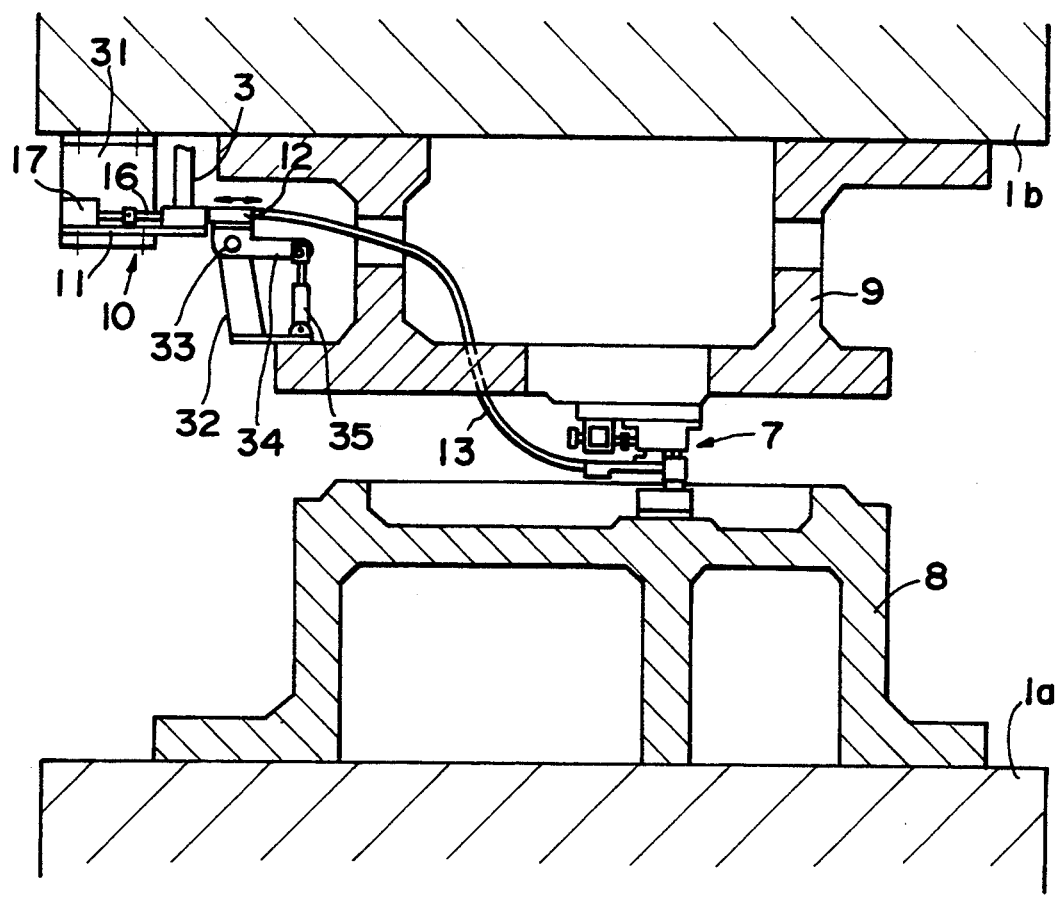
FIG. 2 is a cross-sectional view, on an enlarged scale, of a portion of parts of the system of the present invention in one position thereof.
Figure 3:
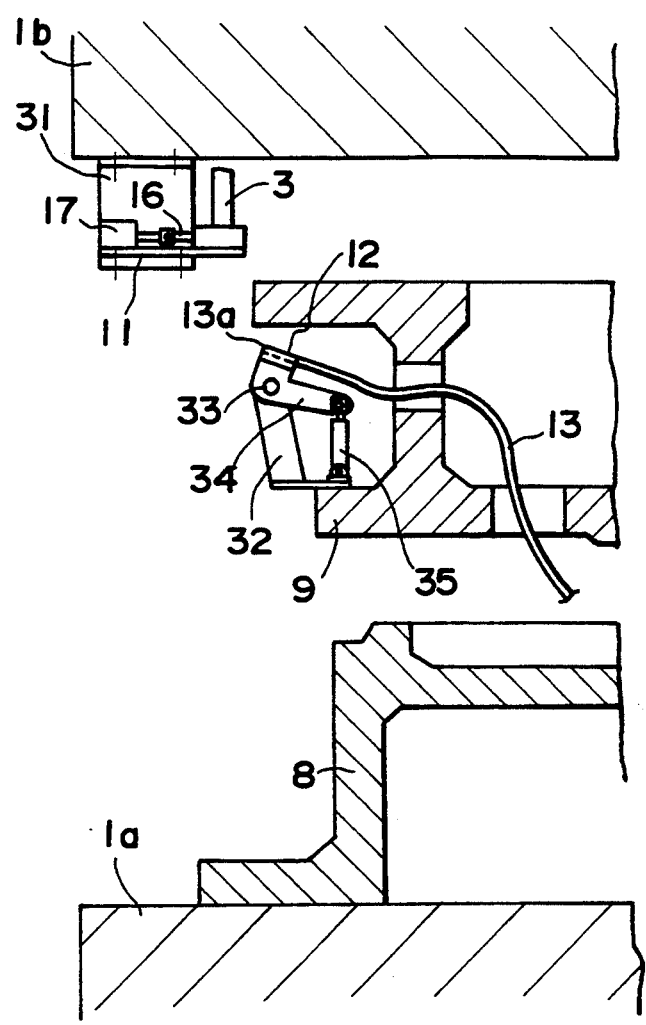
FIG. 3 is a cross-sectional view on an enlarged scale, of the parts of the system of the present invention in another position thereof.
Figure 4:
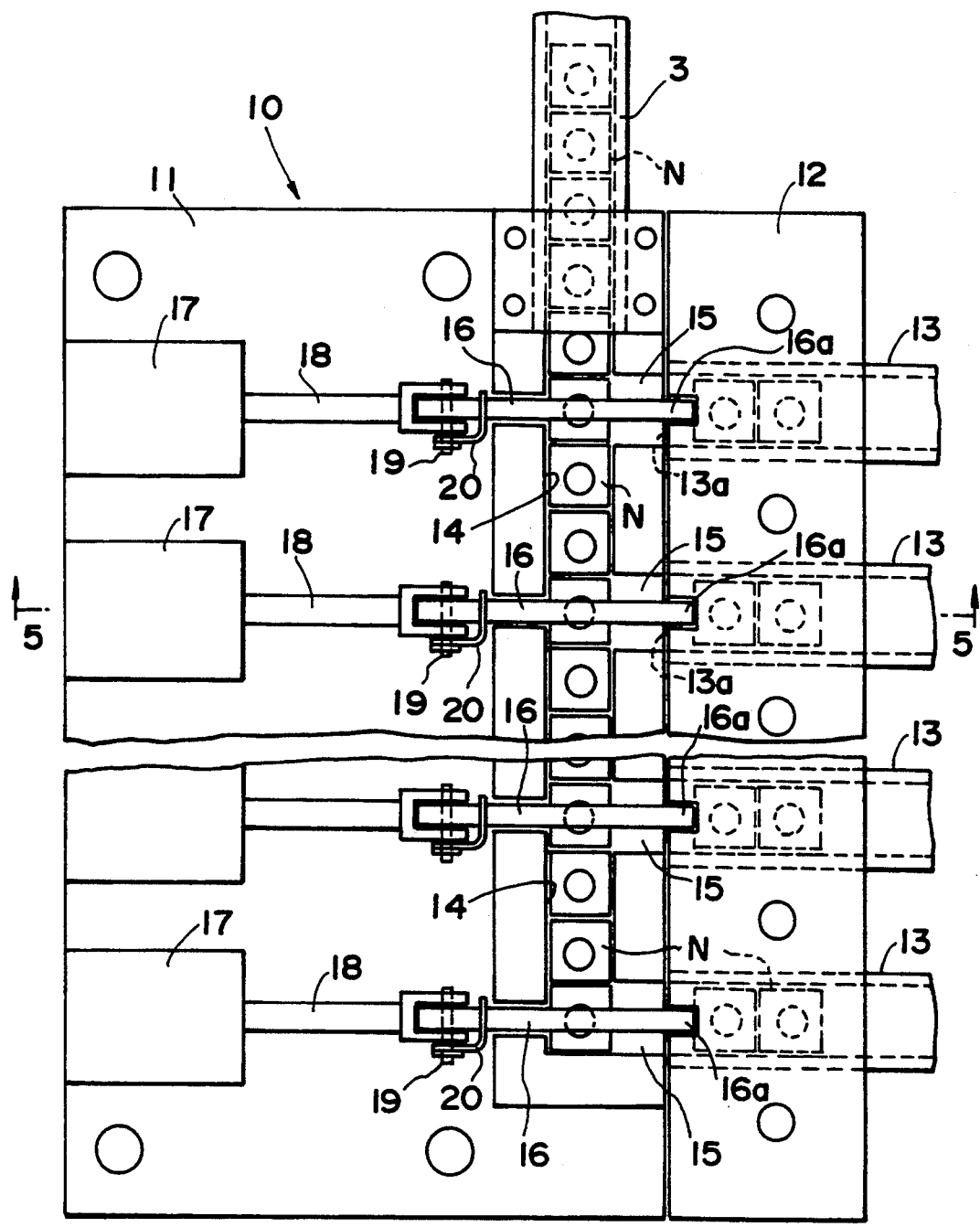
FIG. 4 is a plan view of the row feeder for distributing nuts.
Figure 5:
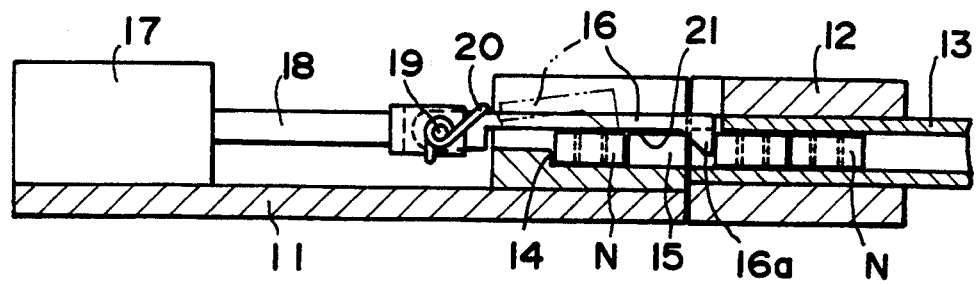
FIG. 5 is a cross-sectional view taken along the lines 5—5 in FIG. 4 and showing a stroking pusher in detail.
Figure 6:
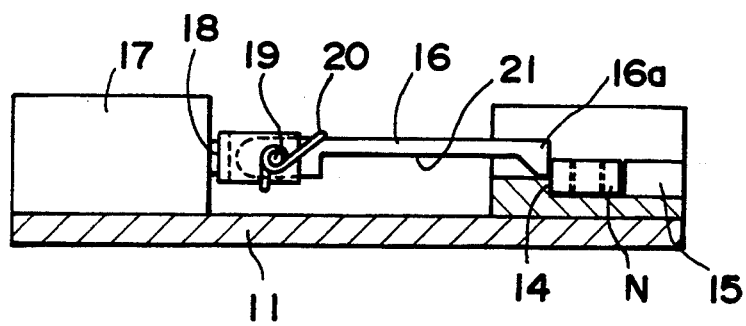
FIG. 6 is a cross-sectional view similar to FIG. 5, but showing the stroking pusher at a home position.
Figure 7:
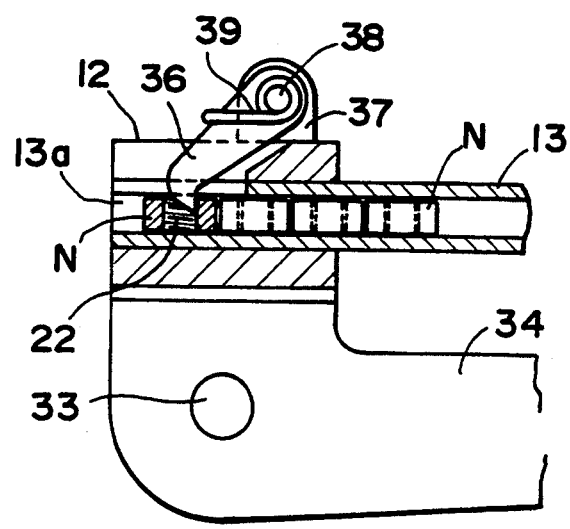
FIG. 7 is a partial cross-sectional front elevation view of a joint member of the system of the present invention.

In the row feeder 10 in this case, the main unit 11 of the described structure is fixedly attached to the ram 1b by means of a bracket 31, in a manner as shown in FIG. 2. A swingable arm 34 carrying the joint member 12 is journaled on a bracket 32 by a pivot 33, with this bracket being fixed to the upper mold 9. A pneumatically driven cylinder 35 drives the swingable arm 34 to rotate about the pivot 33, so that the arm 34 is pivoted between a horizontal position and an inclined position. As shown in FIG. 3, the arm 34 pivots so as to tilt the joint member 12 when the upper mold 9 is detached from the ram 1b and automatically replaced with another upper mold. Thus, an entrance 13a of the feed chute 13 carried by the joint member 12 will assume an obliquely raised position, such that the nuts N within the feed chute are protected from slipping off the entrance. FIG. 7 illustrates a device which may preferably be employed for a surer protection of nuts N from unintentional droppage. The device in FIG. 7 comprises a pawl 36 which is disposed on the joint member 12 and engageable with a threaded bore 22 of the nut N held in the feed chute 13 and standing nearest its entrance 13a. A bracket 37, secured to the joint member 12, includes a pin 38 about which the pawl 36 can pivot, and a spring 39, wound around the pin 38, acts on the pawl and urges the end thereof in a downward direction.

In operation, the upper mold 9 is set in place at first on the ram 1b. Then, the swingable arm 34 is driven causing the joint member 12 to assume a horizontal position. The feed chutes 13 thus have thus their entrances 13a aligned in communication with the respective distribution passages 15 in the main unit 11. In this state, the pneumatic cylinder 17 will actuate the stroking pusher 16 to make one reciprocation in response to one operation of the self-piercing nut assembling apparatus 7. The free end 16a of the pusher 16 advancing forwards will thus push the nut N out of the guide passage 14 into the distribution passage 15, whereby the nut N enters the feed chute 13 through its entrance 13a. Even while the stroking pusher is operating in this way, delivery of the following nuts N to the guide passage 14 is never interrupted but can continue by virtue of the cutout 21 formed on the lower face of the pusher 16. This will diminish the queuing time for the nuts N to be delivered to the guide passage 14, thus minimizing the time loss in supplying the nuts N through the flexible chute hose 3. On the other hand, when the pusher 16 is retracted, its bump-shaped free end 16a will be pulled backwards and slidingly over the upper face of the nut N which is waiting at that time in the guide passage 14, in such a manner as the phantom line shows in FIG. 5. Upon returning to its rearmost home position, the stroking pusher 16 will be clicked downwards by the spring 20 shown in FIG. 6, whereby the free end 16a comes into contact with, or is postitioned close to, the rearward surface of the nut N which has to be pushed next out of the guide passage.

If one or some of the nut assembling apparatuses 7 in the press 1 are made inoperative, only the stroking pushers 16 corresponding to them will rest still, with the remainder being kept active to successively feed the nuts N.

Instead of arranging side by side the main unit 11 and the joint member 12 in a horizontal plane as in the illustrated embodiment, they may alternatively be vertically disposed up and down if the mounting space for them so compels or is adapted to do so.

It also will be understood that the row feeder provided herein can be used not only for feeding the self-piercing nuts N to the illustrated nut assembling apparatuses 7 but also for distributing ordinary nuts to a plurality of nut welders.

In summary, the row feeder of the present invention enables an efficient distribution of the nuts to a plurality of the nut attaching apparatuses such as those for the self-piercing nuts or the nut welders. Further, this row feeder which is simple in structure and therefore is easy to manufacture at a low cost will remarkably improve the overall economical feature of the system of this kind.

What is claimed is:

1. A row feeder for distribution of nuts, the row feeder comprising:
   a main unit;
   a guide passage formed on the main unit so as to receive a number of successively delivered nuts in a series;
   a plurality of distribution passages formed on the main unit and each extending from and perpendicular to the guide passage;
   stroking pushers reciprocatable across the guide passage so as to transfer the nuts thereon to the respective distribution passages;
   drivers causing the respective stroking pushers to reciprocate; and
   individual feed chutes respectively connected to the distribution passages,
   wherein each stroking pusher has a lower face formed with a cutout such that the successively delivered nuts are not prevented from advancing forward along the guide passage while any stroking pusher is disposed across it to enter the distribution passage.

2. A row feeder as defined in claim 1, further comprising a joint member as a separate member cooperative with the main unit, wherein the feed chutes are fixed to the joint member at given intervals and allowed by the joint member to communicate with the respective distribution passages.

3. A row feeder as defined in in one of claims 1 or 2, wherein the stroking pushers are controlled so as to operate individually whereby any of the pushers can be made inoperative is so desired.

4. A row feeder as defined in claim 1, wherein the stroking pushers are controlled and are responsive to an operation of nut attaching apparatuses.

5. A row feeder as defined in claim 4, further comprising a joint member as a separate member cooperative with a main unit, wherein the feed chutes are fixed to the joint member at given intervals and allowed by the joint member to communicate with the respective distribution passages.

* * * * *